June 24, 1958 R. C. RUSSELL 2,839,950
TRANSMISSION MECHANISMS
Filed May 1, 1953 2 Sheets-Sheet 1

INVENTOR.
ROBERT C. RUSSELL
BY Hudson, Boughton,
Williams, David & Hoffmann
ATTORNEYS June 24, 1958 R. C. RUSSELL 2,839,950
TRANSMISSION MECHANISMS
Filed May 1, 1953 2 Sheets-Sheet 2

INVENTOR.
ROBERT C. RUSSELL
BY Hudson, Boughton,
Williams, David & Hoffmann.
ATTORNEYS United States Patent Office 2,839,950
Patented June 24, 1958

2,839,950

TRANSMISSION MECHANISMS

Robert C. Russell, South Euclid, Ohio, assignor to Eaton Manufacturing Company, Cleveland, Ohio, a corporation of Ohio Application May 1, 1953, Serial No. 352,478

11 Claims. (Cl. 74—677)

This invention relates to power transmission mechanisms, and more particularly, to transmissions of the fluid torque converter type.

An object of the present invention is to provide an improved transmission of this type which is of a very simple and highly practical construction and whose torque amplification at the stall condition of operation is substantially greater than has been obtainable heretofore in devices of this kind.

Another object is to provide an improved transmission of the character mentioned above having a substantially greater torque amplification range than previous devices of this kind and in which the increased torque amplification is obtained with lower slip loss at high output speeds.

A further object is to provide an improved transmission of the toroidal fluid circuit type having multiple turbine members in series fluid circuit relation with a pump member, and in which the turbine member immediately adjacent the pump member is direct-connected with the output shaft means and a turbine member more remote from the pump member is connected with the output shaft means through gearing, preferably planetary gearing.

Additionally, this invention provides an improved transmission of the kind above referred to in which the relatively rotatable members of the toroidal fluid circuit include first and second turbine members and first and second reaction members, one of the reaction members being inhibited against reverse rotation and the other being connected with the sun gear of the planetary gearing.

The invention can be further briefly summarized as consisting in certain novel combinations and arrangements of parts hereinafter described and particularly set out in the claims hereof.

Figure 1:
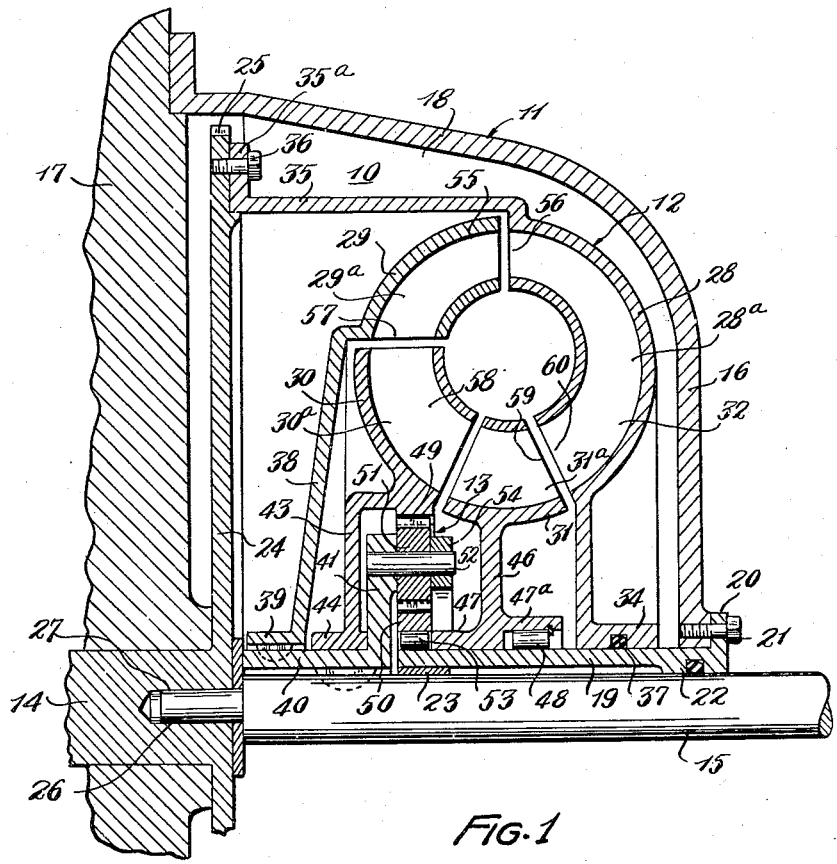
Fig. 1 is a partial vertical axial section taken through a transmission embodying the present invention.

As representing one practical embodiment of the present invention, Fig. 1 shows the improved transmission 10 as comprising, in general, a stationary outer housing 11, a torque amplification device or converter 12 of the toroidal fluid circuit type and a planetary gear system 13 associated with such torque converter. The transmission 10 also comprises a rotatable input member or shaft 14 and a rotatable output member or shaft 15.

The stationary outer housing 11 comprises a housing member 16 which is secured to an adjacent structure 17, such as a portion of a vehicle engine, and cooperates with the latter in defining the chamber 18. The outer housing 11 also comprises a sleeve 19 having an end flange 20 secured to the housing member 16 by means of screws 21. The sleeve 19 extends into the chamber 18 in surrounding relation to the output shaft 15 and is provided with axially spaced bearing and bushing elements 22 and 23 in which the output shaft is rotatably supported.

The rotatable input member 14 comprises a driving member, such as an engine crankshaft, and carries a flange portion or flywheel member 24 which is located in the chamber 18 and is provided peripherally thereof with gear teeth 25 adapted to be engaged by the driving pinion of a conventional starting motor. The output shaft 15 is axially aligned with the input member 14 and is provided with a reduced end portion 26 which is journalled in a pilot bearing socket 27 of the input member 14.

The torque converter 12 comprises a group of relatively rotatable bladed annular members 28, 29, 30 and 31 in cooperating relation and defining a toroidal fluid path or circuit passage 32 interiorly of this device. The member 28 of this group is an annular pump member having an annular group of spaced blades or vanes 28a therein and is adapted to be driven by the input member 14. The pump member 28 is here shown as having a sleeve 34 rotatably journalled on the sleeve 19 of the stationary housing structure 11 and an axially extending, generally cylindrical, portion 35 whose annular flange 35a is secured to the flywheel member 24 by screws 36. The sleeve 34 of the pump member is shown as being provided with an annular packing member 37 which engages the stationary sleeve 19.

The annular member 29 constitutes a first or primary turbine member having an annular group of spaced vanes 29a therein. This first or low-speed turbine is located in immediately adjacent relation to the pump member 28 and includes a substantially radial annular connecting flange or web 38 and an axial sleeve 39. The first turbine 29 is in direct-connected relation to the output shaft 15 by reason of the fact that the sleeve 39 is keyed or splined to a sleeve portion 40 of a carrier member 41 of the planetary gear system 13 and which sleeve portion 40 is, in turn, keyed or splined to the output shaft.

The annular member 30 is a second or high-speed turbine member having an annular group of spaced vanes 30a therein. This second turbine also includes a substantially radial annular connecting flange or web 43 and an axial sleeve 44 which is rotatably journalled on the sleeve portion 40 of the carrier member 41.

The rotatable annular member 31 is a reaction member having an annular group of spaced vanes 31a therein and is disposed between the second turbine 30 and the pump member 28 in the toroidal fluid circuit. This reaction member also has a substantially radial annular connecting flange or web 46 and an axial sleeve 47 journalled on the sleeve 19 of the stationary housing structure 11. The reaction member 31 is inhibited against reverse rotary movement by a one-way brake 48 of a conventional form and which includes an annular group of rollers disposed between the sleeve 19 and an extension portion 47a of the sleeve 47.

The second or high-speed turbine 30 is connected with the output shaft 15 through the planetary gear system 13. This planetary gearing comprises a ring gear 49 secured to and carried by the second turbine 30, a sun gear 50 and an annular group of planet gear pinions 51 disposed between and meshing with the ring gear 49 and the sun gear 50. The planet pinions 51 are rotatably supported by pins 52 projecting axially from the carrier member 41 at circumferentially spaced points in surrounding relation to the output shaft 15. The sun gear 50 is held against reverse rotation by a conventional one-way brake 53 which includes an annular group of rollers disposed between the sun gear and the stationary sleeve 19. The planetary gearing 13 is here shown as also having a connecting ring 54 for the pinion pivot pins 52 and which is connected with the carrier member 41 by these pins.

Figure 2:
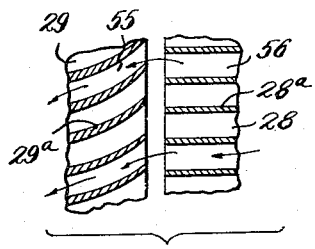
Fig. 2 is a fragmentary view of a diagrammatic nature illustrating the cooperation of the receiving portion of the first turbine with the delivery portion of the pump member.

Fig. 2 of the drawings diagrammatically illustrates the cooperation between the receiving or inlet portion 55 of the first turbine 29 with the delivery portion 56 of the pump member 28. Fig. 2 shows the blade arrangement for the vanes 28a in the delivery portion of the pump member 28 and also shows the blade contour and relative inclination for the vanes 29a in the inlet portion of the first turbine 29.

Figure 3:
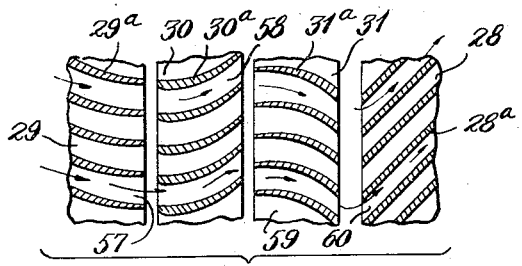
Fig. 3 is another fragmentary view of a diagrammatic nature illustrating the cooperation in the series fluid circuit, of the turbines and reaction member with the pump member.

Fig. 3 of the drawings shows the blade contour and relative inclination of the vanes 29a in the outlet portion 57 of the first turbine 29, and the blade contour and relative inclination of the vanes 30a in the outlet portion 58 of the second turbine 30. In this same view, the blade contour and relative inclination is shown for the vanes 31a of the outlet portion 59 of the reaction member 31. This Fig. 3 also shows the blade contour and relative inclination of the vanes 28a in the inlet portion 60 of the pump member 28.

From the construction of the transmission 10 as above described, it will be seen that the turbines 29 and 30 and the reaction member 31 are in series fluid circuit relation with the pump member 28, with the inlet portion 55 of the first turbine 29 located in immediately adjacent relation to the delivery portion 56 of the pump member 28 and the second turbine 30 located relatively more remote from the pump member. It will also be seen from the blade contour and relative angular positions of the vanes of the annular members, that the velocity fluid stream delivered by the pump member 28 will be very effective on the vanes 29a of the first turbine 29 and also that this stream of fluid, upon leaving the first turbine, will be effectively directed thereby against the vanes 30a of the second turbine 30. Likewise, it will be seen that the vanes 31a of the reaction member 31 will receive the fluid stream from the second turbine 30 and will return the same to the inlet portion 60 of the pump member 28.

Upon the starting of the vehicle engine, the input member 14 will rotate the pump member 28 causing a high velocity fluid stream to be delivered by the pump member to the first turbine 29, resulting in torque from the input member being transmitted through the pump member and first turbine to the output shaft 15. At the starting or stall condition of operation of the transmission 10, the rotation speed of the turbine member 29 is substantially zero, and hence, the velocity stream will be effective thereagainst to develop a high value of torque. The torque thus developed in the turbine member 29 at this stall condition is at substantially a one-to-one ratio. This same velocity stream of fluid, in passing through the second turbine 30 while the latter has the above-mentioned substantially zero speed of the stall condition, is effective thereon by reason of the relative blade angles, to develop a high value of torque in this turbine also. The torque of the second turbine 30 is delivered to the output shaft 15 through the planetary gear system 13, which has a gear ratio of approximately 1.6 to 1.

Assuming that the stall torque being supplied to the second turbine 30 by the fluid stream is approximately 80% of the input torque of the shaft 14, the torque delivered to the output shaft 15 through the planetary gearing by the second turbine, will be .80×1.6=1.28, or in other words, at a torque amplification ratio of 1.28 to 1. The combined torque being delivered to the output shaft 15 by the turbines at this stall condition is the sum of the delivery torque of the first turbine 29 and the delivery torque of the second turbine 30 (1+1.28=2.28), or in other words, at a torque amplification ratio of 2.28.

Additional torque amplification is obtained by the functioning of the reaction member 31 which, by reason of the contour and inclination of its vanes 31a, provides an amplification value of 2, such that the overall total of the torque delivered to the output shaft 15 at the stall condition of operation is 2×2.28=4.56, that is, an overall torque amplification ratio of 4.56 to 1 for the transmission 10 at the stall condition of operation thereof.

As the speed of rotation of the output shaft 15 increases, there is a gradual decrease in the overall torque amplification ratio until the speed of the output shaft is substantially equal to the speed of the input shaft 14. At this time, the turbines 29 and 30 will be rotating at substantially the same speed as the pump member 28, and the torque converter 12 will then be operating as a fluid coupling. The reaction member 31 now rotates freely in a forward direction at substantially the same speed as the pump and turbine members and, at this time, the planetary gearing 13 is substantially ineffective as a reduction gearing.

Figure 4:
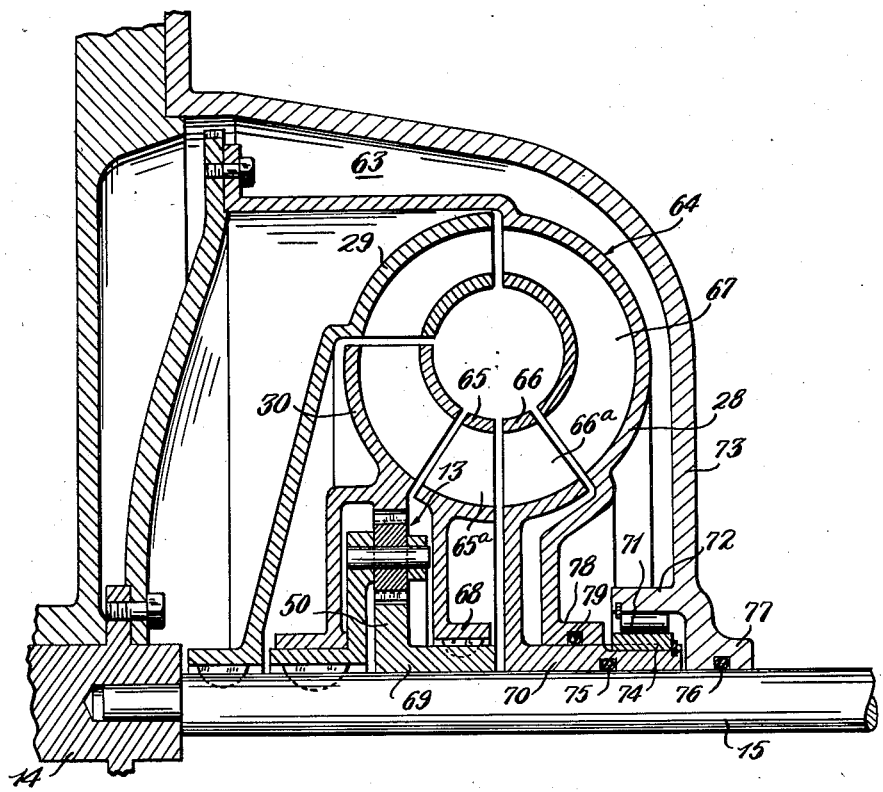
Fig. 4 is a partial vertical axial section similar to Fig. 1, but showing a modified form of the improved transmission.
Figure 6:
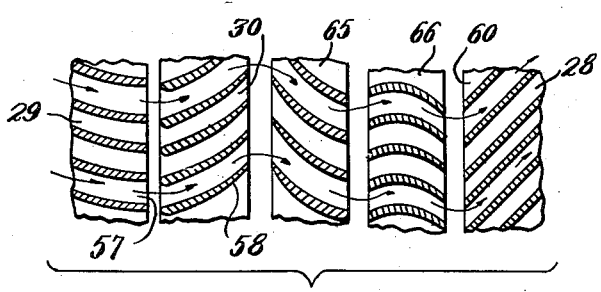
Fig. 6 is a fragmentary view of a diagrammatic nature showing the cooperation of the plural turbines and reaction members with the pump member of the modified transmission.
Figure 5:
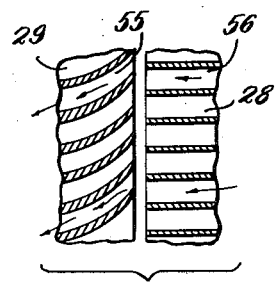
Fig. 5 is a fragmentary view of a diagrammatic nature showing the cooperation of the receiving portion of the first turbine with the delivery portion of the pump member of the modified transmission.

Figs. 4, 5 and 6 of the drawings show a transmission 63 which is generally similar to the transmission 10 of Fig. 1, but in which the reaction means of the torque converter 64 comprises a pair of relatively rotatable annular reaction members 65 and 66 contained in the toroidal fluid circuit 67. These reaction members are provided with annular groups of spaced vanes 65a and 66a and are located in series relation in the fluid circuit between the second turbine 30 and the pump member 28.

In this modified transmission 63, the first reaction member 65 is provided with an axial sleeve 68 which is keyed or splined to an axial sleeve portion 69 of the sun gear 50 of the planetary gearing 13. The sleeve portion 69 of the sun gear 50 is rotatably journalled on the output shaft 15. As thus connected with the sun gear 50, the reaction member 65 is capable of imparting reverse rotary movement to the sun gear.

The second reaction member 66 is provided with an axial sleeve 70 which surrounds the output shaft 15 and is journalled for rotation thereon. This second reaction member is inhibited against reverse rotation by a one-way brake device 71 of a conventional construction, such as a brake comprising an annular group of rollers disposed between an annular flange portion 72 of the stationary housing structure 73 and a ring 74 which is splined to the sleeve 70. Suitable packings 75 and 76 engage the output shaft 15 and are mounted, respectively, in the sleeve 70 of the second reaction member 66 and in the bearing portion 77 of the stationary housing member 73. The pump member 28 is provided with an axial sleeve 78 which is journalled on the sleeve 70 of the second reaction member 66 and is provided with a suitable packing ring 79. In other respects, the transmission 63 is as illustrated in Fig. 4, is similar to the transmission 10 and the same reference characters have been applied to the same corresponding parts.

Fig. 5 of the drawings is similar to Fig. 2 and illustrates the cooperation of the inlet portion 55 of the first turbine 29 with the delivery portion 56 of the pump member 28. Fig. 6 is similar to Fig. 3 in that it shows the blade contour and inclination for the vanes of the outlet portions 57 and 58 of the first and second turbines 29 and 30, and also illustrates the cooperation of the first reaction member 65 with the second turbine 30 and the cooperation of the second reaction member 66 with the inlet portion 60 of the pump member 28.

The functioning of the modified transmission 63 of Fig. 4, is generally similar to the functioning already explained above for the transmission 10 of Fig. 1. Thus, the combined torque amplification obtained from the first and second turbines 29 and 30, and from the planetary gearing 13, together with the amplification derived from the effect of the first reaction member 65, would be an amplification ratio of approximately 4.56 to 1 for the stall condition. In this modified transmission 63, however, the reverse rotation of the first reaction member 65 causes a greater or additional reaction force to be developed by the second reaction member 66. The result of this is that additional torque amplification is thereby obtained for the stall condition of operation of transmission. This additional torque amplification is approximately a 40% increase giving a total overall torque amplification for the transmission 63 at the stall condition of operation thereof, of approximately 6.38 to 1.

As the speed of the output shaft 15 of the modified transmission 63 increases, there is a gradual decrease in torque reaction, and hence, a gradual decrease in torque amplification until eventually the speed of the output shaft approaches the speed of rotation of the input member 14. At this time, the torque amplification ratio will have dropped to zero and the transmission ratio between the input member and output shaft will then be a one-to-one ratio. Under this condition of operation, all of the annular members, including the pump member 28, the first and second turbines 29 and 30 and the two reaction members 65 and 66, will rotate at approximately the same speed, and the torque converter 12 will then be functioning as a fluid coupling.

The advantages of the transmissions 10 and 63 have already been made apparent in the foregoing description, but in addition thereto, it is pointed out that a very important and highly significant characteristic of both of these transmissions is the fact that the second turbine 30 delivers torque to the output shaft 15 through the planetary gearing 13 during the stall or starting condition of these transmissions, whereas in previous multiple-turbine transmissions of this kind, the second turbine is relatively ineffective for delivering torque to the output shaft at the stall condition of the mechanism. Likewise in the operation of the transmission 10 and 63 as above described, it will be seen to be an important characteristic that the first turbine 29 is effective at all times in transmitting torque from the pump member 28 to the output shaft 15. The amount of torque delivered to the output shaft by the first turbine will vary with the torque amplification ratio thereof as explained above and which ratio varies from approximately a 2 to 1 ratio at the stall condition with the reaction means at maximum effectiveness to approximately a 1 to 1 ratio when the torque converter 12 is operating merely as a fluid coupling.

Figure 7:
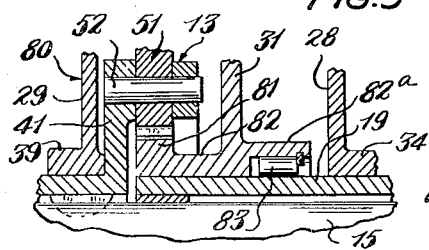
Fig. 7 is a fragmentary sectional view corresponding with a portion of Fig. 1, but showing another modified form of this transmission.

Fig. 7 of the drawing shows a modification of the transmission 10 in which the sun gear 81 of the planetary gearing 13 is connected with the reaction member 31, as by being joined to the sleeve 82 of the latter, and in which a single one-way brake 83 disposed between the stationary sleeve 19 and the sleeve extension 82a, serves both the sun gear and the reaction member. In all other respects the transmission 80 of Fig. 7 corresponds with and functions like the transmission 10.

Although the novel power transmissions have been illustrated and described herein to a somewhat detailed extent, it will be understood, of course, that this invention is not to be regarded as being limited correspondingly in scope, but includes all changes and modifications coming within the terms of the claims hereof.

Having thus described my invention, I claim:

1. In a power transmission mechanism; a group of cooperating relatively rotatable bladed annular members defining a toroidal fluid circuit including pump means, first and second turbines and reaction means in series relation in said circuit with said first turbine and said reaction means disposed adjacent the discharge and inlet portions respectively of said pump means, and said second turbine being between said first turbine and said reaction means; said reaction means being inhibited against reverse rotation; rotatable power input means connected with said pump means; rotatable output shaft means; and torque amplification gearing connecting said second turbine with said output shaft means; said first turbine being direct-connected to said output shaft means.

2. In a power transmission mechanism; a group of cooperating relatively rotatable bladed annular members defining a toroidal fluid circuit including pump means, a relatively low-speed turbine, a relatively high-speed turbine and reaction means in series relation in said circuit; said pump means having fluid inlet and delivery portions and said reaction means being inhibited against reverse rotation; rotatable power input means connected with said pump means; rotatable output shaft means; and torque amplification gearing connecting said high-speed turbine with said output shaft means; said low-speed turbine being direct-connected to said output shaft means, said low-speed turbine being located immediately adjacent said fluid delivery portion and said reaction means being located between said second turbine and said inlet portion.

3. In a power transmission mechanism; a group of cooperating relatively rotatable bladed annular members defining a toroidal fluid circuit including pump means, first and second turbines and reaction means in series relation in said circuit with said first turbine and said reaction means disposed adjacent the discharge and inlet portions respectively of said pump means, and said second turbine being between said first turbine and said reaction means; said reaction means being inhibited against reverse rotation; rotatable power input means connected with said pump means; rotatable output shaft means; and a planetary gear system operably connecting said second turbine with said output shaft means; said first turbine being direct-connected to said output shaft means.

4. In a power transmission mechanism; a group of cooperating relatively rotatable bladed annular members including pump means, first and second turbines and reaction means; said cooperating members defining a toroidal fluid circuit in which said first turbine is located immediately adjacent the discharge portion of the pump means and said first and second turbines are traversed in succession by a stream of velocity fluid delivered by said pump means and in which said reaction means is located between said second turbine and said pump means and returns the fluid to the latter; rotatable power input means connected with said pump means; means inhibiting reverse rotation of said reaction means; rotatable output shaft means; and a planetary gear system operably connecting said second turbine with said output shaft means; said first turbine being direct-connected to said output shaft means.

5. In a power transmission mechanism; a group of cooperating relatively rotatable bladed annular members defining a toroidal fluid circuit including pump means, first and second turbines and reaction means with said first turbine and said reaction means disposed adjacent the discharge and inlet portions respectively of said pump means, and said second turbine being between said first turbine and said reaction means; rotatable power input means connected with said pump means; rotatable output shaft means; a planetary gear system including a sun gear, a ring gear carried by said second turbine, and planet pinions meshing with said sun and ring gears and rotatably mounted on carrier means direct connected with said output shaft means; and means inhibiting reverse rotation of said reaction means and of said sun gear; said first turbine being direct-connected with said output shaft means.

6. In a power transmission mechanism; a group of cooperating relatively rotatable bladed annular members including pump means, first and second turbines and reaction means; said pump means having fluid inlet and discharge portions; said cooperating members defining a toroidal fluid circuit in which said first and second turbines are traversed in series relation by a stream of velocity fluid delivered by said pump means; said first turbine and said reaction means being located respectively adjacent the fluid discharge and inlet portions of said pump means; rotatable power input means connected with said pump means; rotatable output shaft means; a planetary gear system operably connecting said second turbine with said output shaft means and including a sun gear connected with said reaction means for forward rotation with the latter; and means inhibiting reverse rotation of said reaction means and sun gear; said first turbine being direct-connected with said output shaft means.

7. In a power transmission mechanism; a group of cooperating relatively rotatable bladed annular members defining a toroidal fluid circuit including pump means, first and second turbines and reaction means inhibited against reverse rotation; said pump means having fluid inlet and discharge portions; said turbines and said reaction means being traversed in succession in the order named by the fluid and said first turbine and said reaction means being located respectively adjacent the fluid discharge and inlet portions of said pump means; rotatable power input means connected with said pump means; rotatable output shaft means; a planetary gear system including a sun gear, a ring gear carried by said second turbine, and planet pinions meshing with said sun and ring gears and rotatably mounted on carrier means direct-connected with said output shaft means; and means connecting said sun gear for forward rotation with said reaction means; said first turbine being direct-connected with said output shaft means.

8. In a power transmission mechanism; a group of cooperating relatively rotatable bladed annular members including pump means, a first turbine, a second turbine, and reaction means inhibited against reverse rotation; said cooperating members defining a toroidal fluid circuit in which said first turbine is located immediately adjacent the discharge portion of the pump means and said first and second turbines are traversed in succession by a stream of velocity fluid delivered by said pump means; rotatable power input means connected with said pump means; rotatable output shaft means; a planetary gear system including a sun gear inhibited against reverse rotation, a ring gear connected with and carried by said second turbine, and planet pinion gears meshing with said sun and ring gears; and carrier means rotatably supporting said pinion gears; said carrier means and said first turbine being direct-connected with said output shaft means.

9. In a power transmission mechanism; a group of cooperating relatively rotatable bladed annular members including pump means, a first turbine, a second turbine, and reaction means; said cooperating members defining a toroidal fluid circuit in which said first and second turbines are traversed in series relation by a stream of velocity fluid delivered by said pump means; rotatable power input means connected with said pump means; rotatable output shaft means; means inhibiting said reaction means against reverse rotation; a planetary gear system including a sun gear, a ring gear connected with and carried by said second turbine, and planet pinion gears meshing with said sun and ring gears; means inhibiting said sun gear against reverse rotation; and carrier means rotatably supporting said pinion gears; said carrier means and said first turbine being direct-connected with said output shaft means; said first turbine being immediately adjacent said pump means and said reaction means being between said second turbine and said pump means.

10. In a power transmission mechanism; a group of cooperating relatively rotatable bladed annular members including pump means, first and second turbines, and a reaction means comprising first and second reaction members; said pump means having fluid inlet and discharge portions; said cooperating members defining a toroidal fluid circuit in which said first and second turbines and said first and second reaction members are traversed in series relation by a stream of velocity fluid delivered by said pump means; said first turbine and said reaction means being located respectively adjacent the fluid discharge and inlet portions of said pump means; rotatable power input means connected with said pump means; rotatable output shaft means; a planetary gear system including a sun gear, a ring gear connected with and carried by said second turbine, and planet pinion gears meshing with said sun and ring gears; carrier means rotatably supporting said pinion gears and drivingly connected with said output shaft means; said first turbine being direct-connected with said output shaft means; means inhibiting reverse rotation of one of said reaction members; and means connecting the other reaction member for rotation with said sun gear.

11. A power transmission mechanism as defined in claim 10 in which said first reaction member is connected for rotation with said sun gear and said second reaction member is inhibited against reverse rotation by said inhibiting means.

References Cited in the file of this patent

UNITED STATES PATENTS

| | | |
|---|---|---|
| 2,203,177 | Patterson | June 4, 1940 |
| 2,293,358 | Pollard | Aug. 18, 1942 |
| 2,298,648 | Russell | Oct. 13, 1942 |
| 2,388,062 | Keller | Oct. 30, 1945 |
| 2,602,353 | Keller | July 8, 1952 |